US008922426B1

(12) United States Patent
Smith et al.

(10) Patent No.: US 8,922,426 B1
(45) Date of Patent: Dec. 30, 2014

(54) SYSTEM FOR GEO-LOCATION

(75) Inventors: Russell Smith, Santa Clara, CA (US); Romain Clement, Mountain View, CA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 12/713,690

(22) Filed: Feb. 26, 2010

(51) Int. Cl.
*G01S 19/40* (2010.01)
*G01S 19/42* (2010.01)

(52) U.S. Cl.
CPC *G01S 19/40* (2013.01); *G01S 19/42* (2013.01)
USPC ................. 342/357.23; 342/357.25; 701/480

(58) Field of Classification Search
CPC ............................... G01S 19/40; G01S 19/42
USPC ........... 342/357.23, 357.25, 357.58; 701/470, 701/480
See application file for complete search history.

(56) References Cited

U.S. PATENT DOCUMENTS

| 5,461,388 | A | * | 10/1995 | Applegate et al. | 342/357.62 |
| 5,883,595 | A | * | 3/1999 | Colley | 342/357.29 |
| 5,902,351 | A | * | 5/1999 | Streit et al. | 701/446 |
| 5,983,160 | A | * | 11/1999 | Horslund et al. | 701/472 |
| 6,134,484 | A | * | 10/2000 | Geier et al. | 701/13 |
| 6,516,021 | B1 | * | 2/2003 | Abbott et al. | 375/150 |
| 7,228,230 | B2 | * | 6/2007 | Hirokawa | 701/472 |
| 7,504,996 | B2 | * | 3/2009 | Martin | 342/357.25 |
| 2005/0134503 | A1 | * | 6/2005 | Colley et al. | 342/357.09 |
| 2007/0132636 | A1 | * | 6/2007 | Young et al. | 342/357.15 |
| 2008/0191935 | A1 | * | 8/2008 | Tidwell | 342/357.02 |
| 2008/0204316 | A1 | * | 8/2008 | Brodie | 342/357.12 |
| 2009/0254275 | A1 | * | 10/2009 | Xie et al. | 701/213 |
| 2010/0019960 | A1 | * | 1/2010 | van Diggelen et al. | 342/357.02 |

OTHER PUBLICATIONS

Lashley et al, "GNSS Solutions: What are vector tracking loops and what are their benefits and drawbacks," InsideGNSS, May/Jun. 2009, pp. 16-21.*

* cited by examiner

*Primary Examiner* — Gregory C Issing
(74) *Attorney, Agent, or Firm* — Marshall, Gerstein & Borun LLP

(57) ABSTRACT

A method, computer program product, and system are provided for position estimation in a geo-location system. For example, the method can include receiving a plurality of position measurements from a respective plurality of satellites in a global navigation satellite system. From the plurality of position measurements, a position measurement with a maximum pseudo-range residual value can be selected. A position uncertainty estimate can be determined based on the position measurement with the maximum pseudo-range residual value. Further, a position estimation algorithm can receive the position uncertainty estimate as an input, thereby improving position estimation of the geo-location system.

9 Claims, 5 Drawing Sheets

SYSTEM FOR GEO-LOCATION

BACKGROUND

1. Field

Embodiments of the present invention generally relate to the field of geo-location. More specifically, embodiments of the present invention refer to a method and system for position estimation in geo-location applications.

2. Background

Geo-location refers to an identification of real-world geographic location of a mobile device. Geo-location data can include navigational information such as country, region, city, latitude, and longitude. With the geo-location data, the location of the mobile device can be determined.

One system that provides navigational information for geo-location is a Global Positioning System (GPS), which is a space-based global navigation satellite system. The GPS includes three primary components: a constellation of satellites that orbit the Earth; control and monitoring stations on Earth; and a GPS receiver. GPS satellites broadcast signals from space to the GPS receiver to provide both three-dimensional location (e.g., latitude, longitude, and altitude) and time.

Since its inception, GPS signals have become widely used in many geo-location applications. For instance, GPS signals are used in many transportation systems, ranging from aviation systems to maritime operations. One limitation with current GPS-based geo-location systems, even high-end systems that have an open-air accuracy to within 1 meter, relates to multi-path errors in GPS signals due to obstructions, such as tall buildings and canyon walls, between GPS satellites and GPS receivers. The obstructions can occlude, as well as reflect, the GPS signals, thus causing delays and inaccuracies in navigational information provided by the GPS signals. This limitation of GPS-based geo-location systems is also known as the "urban canyon" issue.

Methods and systems are needed for accurate position estimation in GPS-based geo-location applications.

SUMMARY

In many global navigation satellite system applications (e.g., GPS-based location applications), accuracy to within 1 meter is not necessary for the application to work for its intended purpose. Rather, a small amount of error often does not detract from the user experience. For example, if the position information is being used to identify an image associated with a given location, such as in Google Street View, then linking an image to a location with an accuracy of 5-10 meters is generally sufficient from a user perspective. Using embodiments of the present invention, the above limitations of current GPS position estimation systems can be overcome, often with less expense than required by current GPS position estimation systems.

Embodiments of the present invention include a method for position estimation in a geo-location system. The method can include receiving a plurality of position measurements from a respective plurality of satellites in a global navigation satellite system. The method can also include selecting a position measurement with a maximum pseudo-range residual value from the plurality of position measurements and determining a position uncertainty estimate based on the position measurement with the maximum pseudo-range residual value. Further, the method can include providing the position uncertainty measurement as an input to a position estimation algorithm, thereby improving accuracy in the position estimation of the geo-location system.

Embodiments of the present invention additionally include a system for geo-location. The system can include a plurality of global navigation satellite system receivers configured to receive a plurality of position measurements from a respective plurality of GPS satellites and a processing unit. The processing unit can be configured to select a position measurement with a maximum pseudo-range residual value from the plurality of position measurements, determine a position uncertainty estimate based on the position measurement with the maximum pseudo-range residual value, and provide the position uncertainty measurement as an input to a position estimation algorithm.

Embodiments of the present invention further include another system for geo-location. The system can include a global navigation satellite system receiver module configured to determine a position estimate of the geo-location system, wherein the receiver module comprises a plurality of single-frequency receivers and a processing unit configured to determine a location of the geo-location system based on the position estimate from the receiver module. The system can further include the following devices: an inertial measurement unit (IMU) configured to determine a positional orientation of the geo-location system; a rangefinder module configured to determine a distance of an object from the geo-location system; a wheel encoder configured to determine a velocity of the geo-location system; a power module configured to supply power to the rangefinder module; and, a controller-area network (CAN) bus configured to enable the processing unit to communicate with a vehicle.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the relevant art that the present invention, as described below, can be implemented in many different embodiments of software, hardware, firmware, and/or the entities illustrated in the figures. Any actual software code with the specialized control of hardware to implement embodiments of the present invention is not limiting of the present invention. Thus, the operational behavior of embodiments of the present invention will be described with the understanding that modifications and variations of the embodiments are possible, given the level of detail presented herein.

For purposes of explanation, embodiments of the present invention will be described in the context of a Global Positioning System (GPS), which is one of many types of global navigation satellite systems. Based on the description herein, a person of ordinary skill in the art will recognize that embodiments of the present invention are equally applicable to other types of global navigation satellite systems such as, for example and without limitation, Galileo (the global navigation system currently being built in Europe) and GLO-NASS (the global navigation system operated in Russia). These other types of global navigation satellite systems are within the scope and spirit of the present invention.

Figure 1:
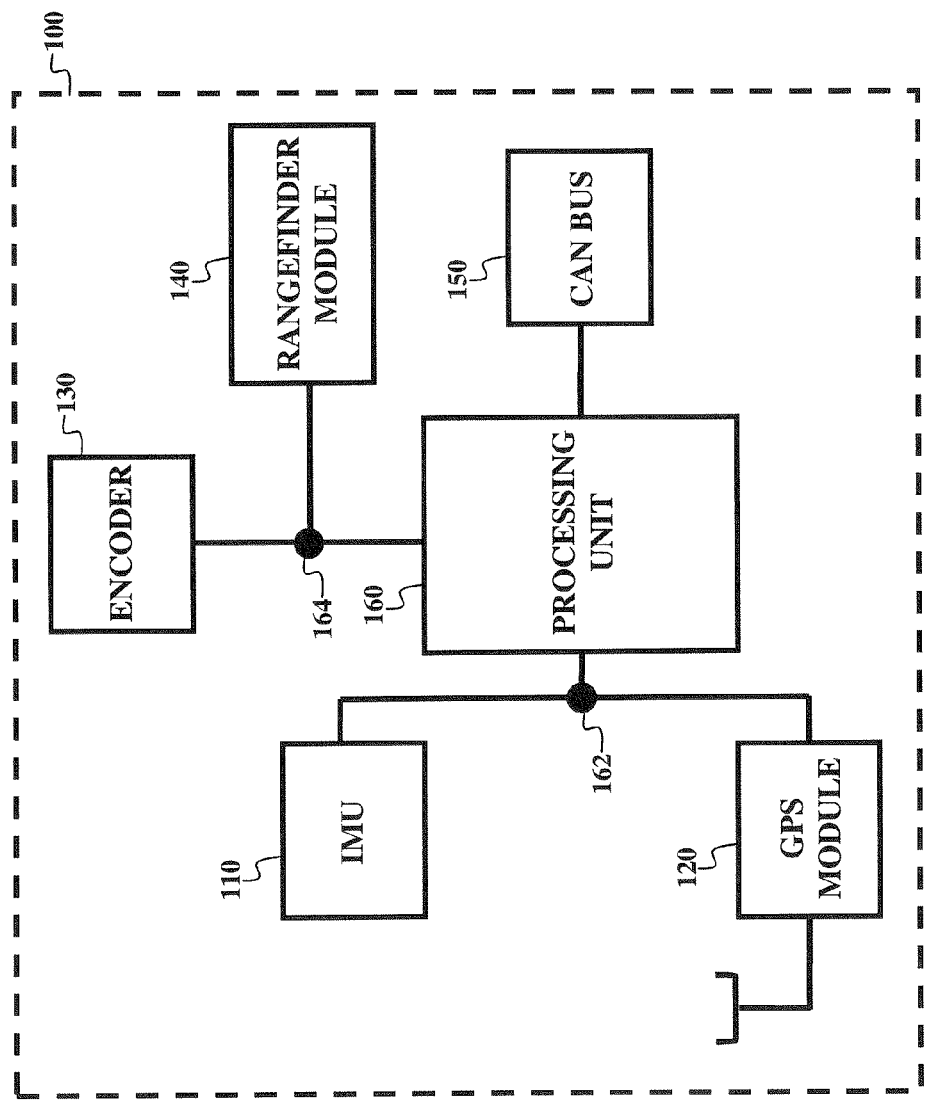
FIG. 1 is an illustration of an embodiment of a geo-location system.

FIG. 1 is an illustration of an embodiment of a geo-location system 100. Geo-location system 100 includes an inertial measurement unit (IMU) 110, a global positioning system (GPS) receiver module 120, an encoder 130, a rangefinder module 140, a controller-area network (CAN) bus 150, and a processing unit 160.

In an embodiment, geo-location system 100 can be used to estimate an absolute position of a moving object, such as, for example, an airplane, an automobile, a bicycle, or a pedestrian. For ease of explanation, the following description of geo-location system 100 will assume that geo-location system 100 is coupled to an automobile (also referred to herein as a "vehicle") and estimates the position of the automobile. A person of ordinary skill in the relevant art will recognize that, based on the description herein, the following description of geo-location system 100 is equally applicable to other moving objects (e.g., trolley, motorcycle, etc.).

In reference to FIG. 1, IMU 110 is configured to measure velocity and positional orientation of the vehicle. For example, with the use of accelerometers and gyroscopes, IMU 110 can measure a current rate of acceleration of the vehicle and detect changes in rotational attributes of the vehicle (e.g., roll, pitch, and yaw). IMU 110 reports the velocity and positional orientation (e.g., direction) information to processing unit 160 for further processing.

GPS receiver module 120 is configured to receive GPS signals from a constellation of GPS satellites. GPS signals can contain, for example, information pertaining to time messages sent to GPS receiver module 120, precise orbital information on the GPS satellites, and general system health and rough orbits of all GPS satellites. With the information contained in the GPS signals, GPS receiver module 120 can measure a transit time of each message and compute a distance to each GPS satellite. The distances to each of the GPS satellites, along with the orbital location of each GPS satellite, can be used to obtain a position estimate of the vehicle. In an embodiment, GPS receiver module 120 can also derive additional information, such as direction and velocity, from changes in position over time. GPS receiver module 120 reports its position/navigational information to processing unit 160 for further processing.

In an embodiment, GPS receiver module 120 can include a GPS receiver that receives signals at two frequencies. For instance, the dual-frequency GPS receiver can receive both L1 and L2 signals from the constellation of GPS satellites. L1 signals are transmitted from GPS satellites to the dual-frequency GPS receiver at, for example and without limitation, approximately 1.6 GHz and carry navigational information such as, for example, coarse-acquisition (C/A) code and encrypted precision (P(Y)) code. Both the C/A code and the P(Y) code provide GPS receiver module 120 with a precise time-of-day. Further, L2 signals are transmitted from GPS satellites to the dual-frequency GPS receiver at, for example and without limitation, approximately 1.2 GHz and carry navigational information such as, for example, P(Y) code and a L2 code (L2C). L2C can be used by the dual-frequency GPS receiver to compensate for atmospheric effects introduced into GPS signals passing through the Earth's atmosphere.

In another embodiment, GPS receiver module 120 can include a GPS receiver that receives GPS signals at a single frequency. For instance, the single-frequency GPS receiver can receive L1 signals from the constellation of GPS satellites. From a cost perspective, the single-frequency GPS receiver is typically less expensive than the dual-frequency GPS receiver since the single-frequency GPS receiver does not require additional hardware to process L2 signals. However, a tradeoff in accuracy may also need to be taken into consideration since the single-frequency GPS receiver does not compensate for atmospheric effects using the L2C. Based on the description below, other components of geo-location system 100 such as, for example, IMU 110, encoder 130, and CAN bus 150 can be used in conjunction with the single-frequency GPS receiver for position estimation, according to an embodiment of the present invention.

Figure 2:
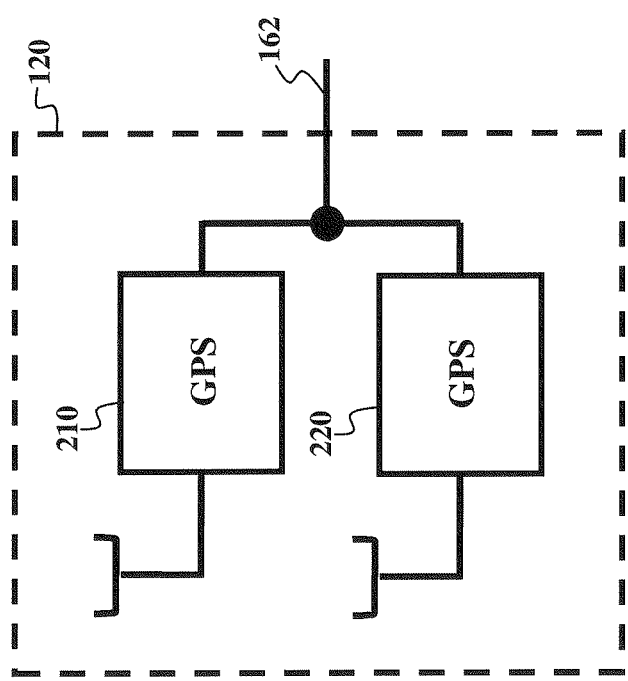
FIG. 2 is an illustration of an embodiment of a GPS receiver module with two single-frequency GPS receivers.

In another embodiment, GPS receiver module 120 can include a plurality of single-frequency GPS receivers. FIG. 2 is an illustration of an embodiment of GPS receiver module 120 with two single-frequency GPS receivers—single-frequency GPS receiver 210 and single-frequency GPS receiver 220. In an embodiment, single-frequency GPS receivers 210 and 220 provide a redundancy function to GPS receiver module 120, in which each single-frequency receiver is configured to receive L1 signals. In a scenario in which single-frequency GPS receivers 210 and 220 receive dissimilar L1 signals to one another (e.g., due to the urban canyon issue), geo-location system 100 can compensate for the position inaccuracy in the GPS signals based on measurements from IMU 110, encoder 130, and/or CAN bus 150. In another scenario in which one of the single-frequency GPS receivers is defective (e.g., broken antenna), the other single-frequency GPS receiver can be used to receive GPS signals from the constellation of GPS satellites. In addition, from a cost perspective, GPS receiver module 120 with the plurality of single-frequency GPS receivers may be a less-expensive design choice over GPS receiver module 120 with a single dual-frequency GPS receiver, since the hardware cost for the dual-frequency GPS receiver may be more expensive than the cumulative cost of the hardware required to implement the plurality of single-frequency GPS receivers.

In yet another embodiment, GPS receiver module 120 can include a plurality of dual-frequency GPS receivers. Similar to the embodiment of GPS receiver module 120 with the plurality of single-frequency GPS receivers, GPS receiver module 120 with the plurality of dual-frequency GPS receivers provides a redundancy function. In particular, in a situation in which each dual-frequency GPS receiver receives dissimilar GPS signals (e.g., L1 and L2 signals) to one another, geo-location system 100 can compensate for the position inaccuracy in the GPS signals based on measurements from IMU 110, encoder 130, and/or CAN bus 150. In addition, a functional dual-frequency GPS receiver can be used in place of a defective dual-frequency GPS receiver (e.g., due to a broken antenna).

In reference to FIG. 1, encoder 130 is configured to measure an angular position of an axle or shaft of the vehicle according to an embodiment of the present invention. In an embodiment, encoder 130 is a quadrature encoder (e.g., rotary wheel encoder) coupled to one or more axles or shafts of the vehicle. Based on the angular position measurement information provided by encoder 130, processing unit 160 can derive navigational information such as, for example, distance traveled by the vehicle and velocity of the vehicle.

Figure 3:
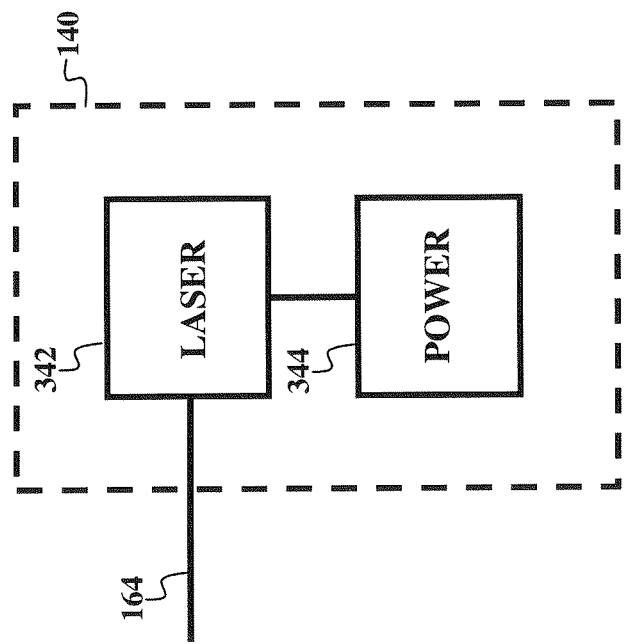
FIG. 3 is an illustration of an embodiment of a rangefinder module.

Rangefinder module 140 is configured to determine a distance of an object from geo-location system 100. FIG. 3 is an illustration of an embodiment of rangefinder module 140, which includes a laser scanner 342 and a power module 344. In an embodiment, laser scanner 342 is configured to send a laser pulse towards an object and measure a time for the laser pulse to reflect off the object and return to rangefinder module 140. The timing information from the reflected laser pulse is collected by rangefinder module 140 and forwarded to processing unit 160 for further processing, according to an embodiment of the present invention. In an embodiment, processing unit 160 can store the timing information in memory (e.g., non-volatile memory), such that three-dimensional (3-D) models representative of the environment traveled by geo-location system 100 can be later generated. Methods and processes used to reconstruct environments based on 3-D models derived from laser scanners are known to persons skilled in the relevant art.

Power module 344 is configured to provide a regulated DC voltage to laser scanner 342, according to an embodiment of the present invention. In an embodiment in which geo-location system 100 is attached to a vehicle, the vehicle may have a local power supply (e.g., car battery) at 12V. On the other hand, depending on the power requirements of laser scanner 342, laser scanner 342 may operate at a higher DC voltage (e.g., 24V) than the local power supply voltage. In an embodiment, power module 344 is configured to transform the local power supply voltage to a desirable operating voltage for laser scanner 342. Devices and methods used to regulate voltages, such as DC-DC converters, are known to persons skilled in the relevant art.

In reference to FIG. 1, CAN bus 150 is configured to allow processing unit 160 to communicate with electronic control units of the vehicle. In an embodiment, processing unit 160 can extract information from wheel sensors on the vehicle (e.g., a rate of rotation and steering angle of an axle) and gear information from the vehicle's transmission (e.g., information on whether the vehicle traveled in a forward or reverse direction) via CAN bus 150. Further, in an embodiment, CAN bus 150 can provide a communication interface between encoder 130 and processing unit 160. Processing unit 160 can use the information provided by CAN bus 150 to derive navigational information such as, for example, velocity and direction of the vehicle. In turn, as described in further detail below, processing unit 160 can use this information, in conjunction with information from IMU 110, GPS receiver module 120, and/or encoder 130, for position estimation in geo-location system 100.

As noted above, in an embodiment, processing unit 160 gathers navigational information from IMU 110, GPS receiver module 120, encoder 130, and CAN bus 150 for position estimation in geo-location system 100. In an example where the vehicle travels through an area in which GPS signals do not suffer from an urban canyon effect, GPS receiver module 120 can provide accurate navigational information (e.g., location, direction, and velocity) to processing unit 160.

Although the GPS signals may not suffer from the urban canyon effect, the navigational information provided by IMU 110, encoder 130, and CAN bus 150 can be used to "fine tune" or enhance the accuracy of the navigational information from GPS receiver module 120. For instance, as described above, IMU 110, encoder 130, and CAN bus 150 can provide information on the velocity, acceleration, and direction of the vehicle. Based on the navigational information provided by IMU 110, encoder 130, and CAN bus 150, processing unit 160 can assess the accuracy of the navigational information provided by GPS receiver module 120. For instance, processing unit 160 can adjust variations in the direction information provided by GPS receiver module 120 based on the direction information derived from IMU 110, encoder 130, and CAN bus 150.

In an embodiment of GPS receiver module 120 that includes the plurality of GPS receivers (e.g., FIG. 2), processing unit 160 can compare the navigational information provided by IMU 110, encoder 130, and CAN bus 150 to each set of navigational information derived from each of the plurality of GPS receivers to assess the accuracy of each GPS receiver. For instance, in reference to FIG. 2, the navigational information from GPS receiver 210 can be compared to the navigational information provided by IMU 110, encoder 130, and CAN bus 150 as well as to the navigational information from GPS receiver 220.

In an embodiment, if the navigational information from GPS receiver 210 varies significantly from the navigational information from GPS receiver 220 (e.g., due to GPS signals suffering from the urban canyon effect or if one of the GPS receivers is defective), the navigational information provided by IMU 110, encoder 130, and CAN bus 150 can be used to determine which of the two GPS receivers (if any) provides reliable navigational information. If the velocity, acceleration, and direction information derived from GPS receivers 210 and 220 differ from one another above a predetermined threshold, then this information from each of the GPS receivers 210 and 220 can be compared to the same type of information provided by IMU 110, encoder 130, and CAN bus 150 to determine which of the two GPS receivers provides reliable navigational information, according to an embodiment of the present invention.

For instance, if the navigational information from GPS receivers 210 and 220 differ from one another by at least 10%, then the navigational information from each of the GPS receivers is compared to the same type of navigational information provided by IMU 110, encoder 130, and CAN bus 150 to determine which of the two GPS receivers provides reliable navigational information. Further, if the comparison of navigational information from one of the GPS receivers to the navigational information provided by IMU 110, encoder 130, and CAN bus 150 is within a predetermined threshold, then this GPS receiver can be designated as a reliable source of navigational information. On the other hand, in an embodiment, if the comparison of navigational information from both GPS receivers does not fall within the predetermined threshold, then neither of the GPS receivers is designated as a reliable source of navigational information.

In another example where the vehicle travels through an area in which GPS signals suffer from the urban canyon effect, GPS receiver module 120 may not be able to provide accurate (if any) navigational information to processing unit 160 (e.g., GPS receiver module 120 is not a reliable source of navigational information). In this instance, the navigational information provided by IMU 110, encoder 130, and CAN bus 150 can be used by processing unit 160 to derive a location of the vehicle relative to a previously known absolute position, according to an embodiment of the present invention.

In an embodiment, processing unit 160 can assess a vehicle location in which GPS receiver module 120 last provides an accurate position measurement. As noted above, processing unit 160 can compare the navigational information from IMU 110, encoder 130, and CAN bus 150 to the same type of information from GPS receiver module 120. If this comparison yields a result that is above a predetermined threshold, then processing unit 160 can determine that GPS receiver module 120 provides an inaccurate position measurement. For instance, if the velocity, acceleration, and direction information derived from IMU 110, encoder 130, and CAN bus 150 differs from the same type of information provided by GPS receiver module 120 by at least 10%, then processing unit 160 can determine that GPS receiver module 120 provides an inaccurate position measurement and assess the location of the vehicle at this occurrence. From this vehicle location, processing unit 160 can track the relative location of the vehicle based on navigational information provided by IMU 110, encoder 130, and CAN bus 150 until the navigational information provided by GPS receiver module 160 falls within the predetermined threshold, according to an embodiment of the present invention. In an embodiment, when the navigational information provided by GPS receiver module 160 falls back within the predetermined threshold, processing unit 160 incorporates the GPS signal information into the overall position estimation of the vehicle.

In another embodiment, processing unit 160 can determine that GPS receiver module 120 is inaccurate based on the time signal received from GPS receiver module 120. For example, if the time signal received from GPS receiver module 120 differs from a time calculated by processing unit 160 (e.g., using information from CAN bus 150 and/or the electronic control units of the vehicle) by a predetermined amount, then processing unit 160 can determine that GPS receiver module 120 also provides an inaccurate position measurement. Such a difference in time signal can occur, for example, when GPS receiver module 120 receives a GPS signal reflected off one or more obstructions instead of directly from a GPS satellite.

Once processing unit 160 collects navigational information from IMU 110, GPS receiver module 120, encoder 130, and CAN bus 150, processing unit 160 can process the information in one of two ways, according to an embodiment of the present invention. First, in an embodiment, processing unit 160 can use the navigational information to provide "real-time" or "near real-time" geo-location position measurement of the vehicle carrying geo-location system 100. Second, in an embodiment, processing unit 160 stores the navigational information in a memory module such as, for example, a non-volatile memory device. Also, processing unit 160 can store data collected from rangefinder module 140 on the memory module. The navigational information and information from rangefinder module 140 can later be transferred to a database for further processing, according to an embodiment of the present invention. Among other things, the database can reconstruct the environment in which the vehicle (carrying geo-location system 100) traveled based on the navigational information and the information from rangefinder module 140.

Based on the description herein, a person of ordinary skill in the art will recognize that the above-described embodiments of geo-location system 100 can be modified for other modes of transportation. For example, geo-location system 100 can be modified to operate with a flying object such as, for example, an airplane or helicopter. In another example, based on the description herein, a person of ordinary skill in the art will recognize that the above-described embodiments of geo-location system 100 can be modified to operate with a pedestrian, where geo-location system 100 can be attached to the pedestrian via a backpack or the like. These modifications to geo-location system 100 to accommodate other types of moving objects are within the scope and spirit of the present invention.

Figure 4:
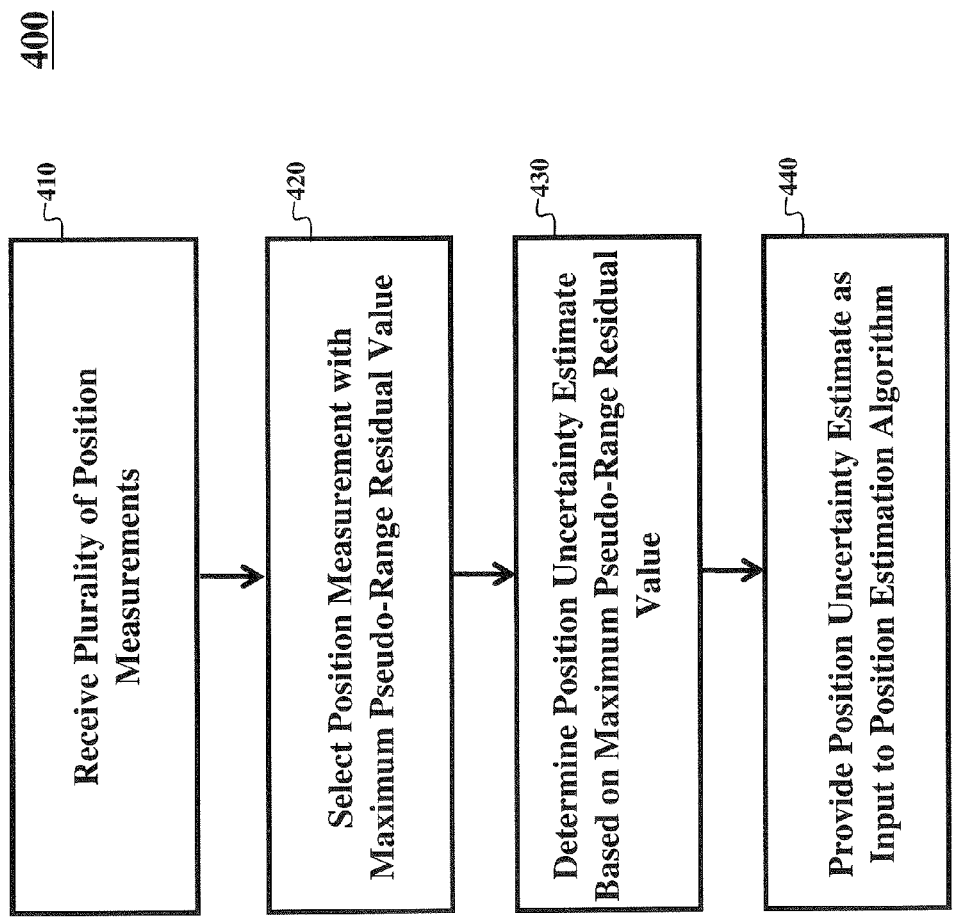
FIG. 4 is an illustration of an embodiment of a method for position estimation in a geo-location system.

FIG. 4 is an illustration of an embodiment of a method 400 for position estimation in a geo-location system. Method 400 can occur using, for example, geo-location system 100 of FIG. 1. For ease of explanation, geo-location system 100 will be used to facilitate in the description of method 400. However, based on the description herein, a person of ordinary skill in the art will recognize that method 400 can be executed by a processing unit located at a remote location from geo-location system 100. For instance, processing unit 160 of FIG. 1 can transfer information provided by IMU 110, GPS receiver module 120, encoder 130, and CAN bus 150 to a remotely-located database with a processing unit, where the remotely-located processing unit can execute the steps of method 400.

In an embodiment, geo-location system 100 assigns an error estimate to navigational information provided by each of its measurement units when determining a position measurement. For instance, an error estimate is assigned to the navigational information provided by IMU 110, GPS receiver module 120, encoder 130, and CAN bus 150. The error estimate associated with each of these measurement units takes into account factors such as, for example, drifts in measurement and inaccuracies in the GPS signal. Further, the navigational information from each of the measurement devices and the error estimate associated with each of the measurement devices can be processed by a Kalman filter to determine a position estimate for geo-location system 100, according to an embodiment of the present invention. Kalman filters are known by persons skilled in the relevant art.

Method 400 is directed to assigning an error estimate to the navigational information provided by GPS receiver module 120. As known by persons skilled in the relevant art, GPS receivers (e.g., GPS receiver module 120) can perform a Receiver Autonomous Integrity Monitoring (RAIM) function, where the RAIM function can detect faults with GPS position measurements. The RAIM function can calculate a "pseudo-range residual" value (e.g., in meters) for each satellite in the GPS constellation of satellites. The pseudo-range residual value represents an error estimate between a position measurement transmitted from a GPS satellite and a position measurement computed by the GPS receiver. Ideally, for a GPS constellation of satellites, the pseudo-range residual value for each of the GPS satellites should be a low value, indicating a consistency between the satellite's position measurement and the GPS receiver's computed position measurement. However, a pseudo-range residual value that differs significantly from the other pseudo-range residual values may indicate a fault with the associated satellite or a signal integrity problem (e.g., urban canyon issue).

Typically, pseudo-range residual values are not used by geo-location systems in position estimation algorithms. However, method 400 uses pseudo-range residual values to determine an error estimate for the position measurement provided by GPS receiver module 120 in geo-location system 100.

In step 410, processing unit 160 receives a plurality of position measurements from a plurality of satellites in a global positioning system (GPS). In an embodiment, the plurality of position measurements can be received by GPS receiver module 120 of FIG. 1 and transferred to processing unit 160. As described above, GPS receiver module 120 can include a single-frequency GPS receiver, a dual-frequency GPS receiver, a plurality of single-frequency GPS receivers, and a plurality of dual-frequency GPS receivers that are all configured to receive position measurements from the plurality of GPS satellites.

In step 420, processing unit 160 selects a position measurement that corresponds to a maximum pseudo-range residual value from the plurality of position measurements. In an embodiment, GPS receiver module 120 of FIG. 1 can perform a RAIM function to calculate a pseudo-range residual value for each of the satellites in the plurality of GPS satellites. The maximum pseudo-range residual value represents a satellite's position measurement that has the greatest deviation from a computed measurement position (e.g., calculated by GPS receiver module 120).

In an embodiment, each of the pseudo-range residual values derived from the plurality of GPS satellites can be scaled based on an angular direction and a signal strength of the associated GPS satellite. For instance, if a satellite is located directly over geo-location system 100 (e.g., at a 0° angular direction with respect to a vertical axis through geo-location system 100), then the pseudo-range residual value associated with this satellite is scaled to a lower value compared to a satellite located along a horizon with respect to geo-location system 100 (e.g., at a 90° angular direction with respect to the vertical axis through geo-location system 100). In this example, the GPS satellite located directly over geo-location system 100 is less likely to provide an inaccurate position measurement to GPS receiver module 120 because GPS signals from this satellite are less likely to suffer from an urban canyon effect than GPS signals transmitted from the GPS satellite located off to the side of geo-location system 100.

In an embodiment, an absolute value representation of a relative angular direction for each of the GPS satellites can be multiplied by the pseudo-range residual value associated with the satellite to determine a scaled pseudo-range residual value based on elevation, according to an embodiment of the present invention. For example, for a satellite located −45° with respect to the reference vertical axis through geo-location system 100, a value of '0.71' (the sine value of 45 degrees) can be multiplied by the pseudo-range residual value of the satellite to determine the satellite's scaled pseudo-range residual value. Likewise, for a satellite located 0° with respect to the reference vertical axis through geo-location system 100 (e.g., directly overhead geo-location system 100), then the scaled pseudo-range residual value for this satellite is '0'.

In addition to angular direction, the pseudo-range residual values derived from the plurality of GPS satellites can be scaled based on signal strength. In an embodiment, if a GPS satellite provides a relatively high signal strength compared to other GPS satellites, then the pseudo-range residual value for this satellite is scaled to a lower value compared to a pseudo-range residual value associated with the GPS satellite with the weaker signal strength. This is because the satellite with the stronger signal strength is less likely to suffer from the effects of signal attenuation (e.g., due to the urban canyon effect) compared to the satellite with the weaker signal strength.

In an embodiment of step 420, based on the scaled pseudo-range residual values for each of the GPS satellites, processing unit 160 selects a position measurement that corresponds to a maximum scaled pseudo-range residual value.

In reference to FIG. 4, in step 430, processing unit 160 determines a position uncertainty estimate based on the position measurement that corresponds to the maximum pseudo-range residual value (from step 420). In an embodiment, the position uncertainty estimate for the position measurement that corresponds to the maximum pseudo-range residual value is determined within the framework of a Kalman filter, where the maximum pseudo-range residual value represents a covariance associated with state vector information derived from the position measurement provided by the associated GPS satellite. Based on the covariance and the state vector information, the position uncertainty estimate can be calculated for the GPS satellite associated with the maximum pseudo-range residual value, as would be understood by a person skilled in the relevant art. Based on the description herein, a person of ordinary skill in the art will recognize that the maximum scaled pseudo-range residual value (from step 420) can also represent the covariance associated with the state vector information derived from the position measurement provided by the associated GPS satellite.

In step 440, processing unit 160 uses the position uncertainty estimate (from step 430) as an input to a position estimation algorithm, thereby improving accuracy in the position estimation of geo-location system 100. In an embodiment, a Kalman filter can be used as the position estimation algorithm. Kalman filters are known by persons skilled in the relevant art.

Inputs to the Kalman filter include state vector information derived from navigational information provided by IMU 110, GPS receiver module 120, encoder 130, and CAN bus 150, along with error estimates (e.g., covariances) associated with the navigational information provided by each of the measurement units. In an embodiment, predetermined error estimates can be associated with the navigational information provided by IMU 110, encoder 130, and CAN bus 150. These error estimates, along with state vector information derived from the navigational information provided by IMU 110, encoder 130, and CAN bus 150, and the position uncertainty estimate of GPS receiver module 120 (from step 430) can serve as inputs to the Kalman filter.

In an embodiment, by using the pseudo-range residual value with the maximum value, the position estimation from the Kalman filter calculation is based on an over-estimation in the position measurement of the associated GPS satellite. The over-estimated position measurement is a good error estimate (e.g., covariance) to be used with the state vector information derived from the associated GPS satellite because Kalman filter calculations are less sensitive (e.g., easier to converge on a solution) to over-estimated values as compared to under-estimated values, according to an embodiment of the present invention.

In an embodiment, another factor in the Kalman filter calculation that provides ease of convergence is a selection of the state vector information for the velocity of the vehicle. Typically, the velocity state vector information derived from the movement of the vehicle can be based on a global reference (or world reference). In particular, latitude, longitude, and altitude parameters that are measured with respect to the global reference can be used to derive the velocity state vector information, as would be understood by a person of ordinary skill in the relevant art.

In an embodiment, except for deriving the velocity state vector information based on the global reference, a local reference can be used to derive the state vector information for the velocity of the vehicle. The local reference can be IMU 110 of geo-location system 100, according to an embodiment of the present invention. In an embodiment, an IMU-relative state vector for velocity can be derived from IMU parameters such as, for example, pitch, roll, and yaw. These IMU parameters can be used to estimate an angular movement of the vehicle. In particular, the pitch parameter indicates an angular movement of the vehicle in an upward and downward direction. The roll and yaw parameters indicate an angular movement of the vehicle in a left and right direction. Based on these parameters provided by IMU 110, the velocity state vector information of the vehicle can be determined relative to the IMU, according to an embodiment of the present invention.

As described above, the velocity state vector information for the vehicle can be based on angular movement measurements provided by IMU 110 (e.g., pitch, roll, and yaw). This velocity state vector information can serve as an input to the Kalman filter calculation to determine position estimation of geo-location system 100, according to an embodiment of the present invention. In addition to the velocity state vector information derived from IMU 110, the Kalman filter calculation takes into account an uncertainty position estimate (e.g., covariance) associated with the velocity state vector information, as would be understood by a person skilled in the relevant art.

In an embodiment, a Gaussian Probability Density Function (PDF) can be used to derive the uncertainty position estimate from the velocity state vector derived from IMU 110. Based on the Gaussian PDF-based uncertainty position estimate and the velocity state vector information derived from IMU 110, ease of convergence on a solution from the Kalman filter calculation, as well as an accurate velocity vector component of the position estimation for geo-location system 100, is achieved according to an embodiment of the present invention.

Figure 5:
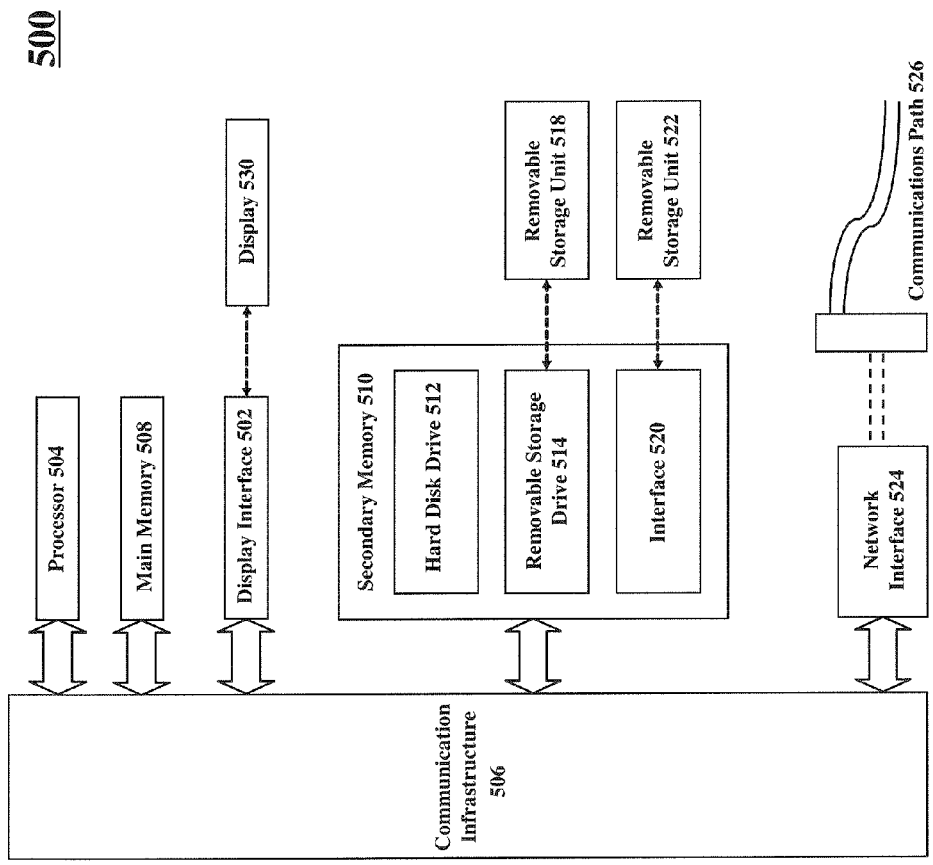
FIG. 5 is an illustration of an example computer system in which embodiments the present invention can be implemented.

Various aspects of the present invention may be implemented in software, firmware, hardware, or a combination thereof. FIG. 5 is an illustration of an example computer system 500 in which embodiments of the present invention, or portions thereof, can be implemented as computer-readable code. For example, the methods illustrated by flowchart 400 of FIG. 4 or system 100 of FIG. 1 can be implemented in computer system 500. Various embodiments of the invention are described in terms of this example computer system 500. After reading this description, it will become apparent to a person skilled in the relevant art how to implement embodiments of the invention using other computer systems and/or computer architectures.

Computer system 500 includes one or more processors, such as processor 504. Processor 504 may be a special purpose or a general purpose processor. Processor 504 is connected to a communication infrastructure 506 (e.g., a bus or network).

Computer system 500 also includes a main memory 508, preferably random access memory (RAM), and may also include a secondary memory 510. Secondary memory 510 can include, for example, a hard disk drive 512, a removable storage drive 514, and/or a memory stick. Removable storage drive 514 can comprise a floppy disk drive, a magnetic tape drive, an optical disk drive, a flash memory, or the like. The removable storage drive 514 reads from and/or writes to a removable storage unit 518 in a well known manner. Removable storage unit 518 can include a floppy disk, magnetic tape, optical disk, etc. which is read by and written to by removable storage drive 514. As will be appreciated by persons skilled in the relevant art, removable storage unit 518 includes a computer-usable storage medium having stored therein computer software and/or data.

In alternative implementations, secondary memory 510 can include other similar devices for allowing computer programs or other instructions to be loaded into computer system 500. Such devices can include, for example, a removable storage unit 522 and an interface 520. Examples of such devices can include a program cartridge and cartridge interface (such as those found in video game devices), a removable memory chip (e.g., EPROM or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices. Communications interface 524 can include a modem, a network interface (such as an Ethernet card), a communications port, a PCMCIA slot and card, or the like. Software and data transferred via communications interface 524 are in the form of signals, which may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, a RF link or other communications channels.

In this document, the terms "computer program medium" and "computer-usable medium" are used to generally refer to media such as removable storage unit 518, removable storage unit 522, and a hard disk installed in hard disk drive 512. Computer program medium and computer-usable medium can also refer to memories, such as main memory 508 and secondary memory 510, which can be memory semiconductors (e.g., DRAMs, etc.). These computer program products provide software to computer system 500.

Computer programs (also called computer control logic) are stored in main memory 508 and/or secondary memory 510. Computer programs may also be received via communications interface 524. Such computer programs, when executed, enable computer system 500 to implement embodiments of the present invention as discussed herein. In particular, the computer programs, when executed, enable processor 504 to implement processes of the present invention, such as the steps in the methods illustrated by flowchart 400 of FIG. 4, discussed above. Accordingly, such computer programs represent controllers of the computer system 500. Where embodiments of the invention are implemented using software, the software can be stored in a computer program product and loaded into computer system 500 using removable storage drive 514, interface 520, hard drive 512 or communications interface 524.

Embodiments of the invention are also directed to computer program products including software stored on any computer-usable medium. Such software, when executed in one or more data processing device, causes a data processing device(s) to operate as described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for improving position estimation in a geo-location system, comprising:
    receiving, by a receiver module, a plurality of time signals from a respective plurality of satellites in a global navigation satellite system,
    generating, by one or more processors, a position estimate for the receiver module using the plurality of time signals;
    determining, by the one or more processors, a respective pseudo-range residual value for each of the plurality of satellites to generate a plurality of pseudo-range residual values, wherein each pseudo-range residual value represents a respective error associated with (i) the position estimate for the receiver and (ii) a time signal received from the corresponding one of the plurality of satellites, wherein the time signal is one of the plurality of time signals;
    selecting, by the one or more processors from the plurality of satellites, a satellite corresponding to a maximum pseudo-range residual value in the plurality of pseudo-range residual values;
    using the maximum pseudo-range residual value to determine, by the one or more processors, a position uncertainty estimate; and
    providing, by the one or more processors, the position uncertainty estimate as an input to a position estimation algorithm.

2. The method of claim 1, wherein receiving the plurality of time signals comprises receiving the plurality of time signals with a plurality of single-frequency band global navigation satellite system receivers.

3. The method of claim 1, wherein selecting the satellite corresponding to the maximum pseudo-range residual value comprises:
    scaling each of the plurality of pseudo-range residual values based on an elevation and a signal strength of the corresponding one of the plurality of satellites to generate a plurality of scaled pseudo-range residual values; and
    selecting a scaled pseudo-range residual value with a maximum value from the plurality of scaled pseudo-range residual values.

4. The method of claim 1, wherein providing the position uncertainty estimate comprises over-estimating a geographic position measurement error.

5. The method of claim 4, wherein over-estimating the geographic position measurement error comprises converging on a solution for geographic position measurement based on a Kalman filter calculation.

6. The method of claim 5, wherein converging on the solution based on the Kalman filter comprises using a state vector based on velocity information relative to an inertial measurement unit.

7. A system for geo-location, comprising:
    a plurality of global navigation satellite system receivers configured to receive a plurality of time signals from a respective plurality of global navigation satellites; and
    a processing unit configured to:
        generate a position estimate for the system using the plurality of time signals,
        determine a respective pseudo-range residual value for each of the plurality of global navigation satellites to generate a plurality of pseudo-range residual values, wherein each pseudo-range residual value represents a respective error associated with (i) the position estimate for the system and (ii) a time signal received from the corresponding one of the plurality of global navigation satellites, wherein the time signal is one of the plurality of time signals,
        select, from the plurality of satellites, a satellite corresponding to a maximum pseudo-range residual value in the plurality of pseudo-range residual values;
        use the maximum pseudo-range residual value to determine a position uncertainty estimate, and
        provide the position uncertainty estimate as an input to a position estimation algorithm.

8. The system of claim 7, further comprising:
    an inertial measurement unit configured to determine a positional orientation of the geo-location system;
    a rangefinder module configured to determine a distance of an object from the geo-location system;
    an encoder configured to determine velocity of the geo-location system;
    a power module configured to supply power to the rangefinder module; and
    a controller-area network (CAN) bus configured to enable the processing unit to communication with a vehicle.

9. The system of claim 7, wherein the processing unit is configured to:
    scale each of the plurality of pseudo-range residual values based on an elevation and a signal strength of the corresponding one of the plurality of satellites to generate a plurality of scaled pseudo-range residual values, and
    select a scaled pseudo-range residual value with a maximum value from the plurality of scaled pseudo-range residual values.

* * * * *